United States Patent
Meyn

(10) Patent No.: US 7,717,978 B2
(45) Date of Patent: May 18, 2010

(54) METHOD AND INSTALLATION FOR PRODUCTION OF SECONDARY STEEL BASED ON SCRAP

(75) Inventor: Matthias Meyn, Hilden (DE)

(73) Assignee: SMS Siemag Aktiengesellschaft, Dusseldorf (DE)

(*) Notice: Subject to any disclaimer, the term of this patent is extended or adjusted under 35 U.S.C. 154(b) by 326 days.

(21) Appl. No.: 11/659,430

(22) PCT Filed: Dec. 2, 2005

(86) PCT No.: PCT/EP2005/012953

§ 371 (c)(1),
(2), (4) Date: Jan. 31, 2005

(87) PCT Pub. No.: WO2006/058787

PCT Pub. Date: Jun. 8, 2006

(65) Prior Publication Data

US 2008/0115625 A1    May 22, 2008

(30) Foreign Application Priority Data

Dec. 4, 2004    (DE) ........................ 10 2004 058 492

(51) Int. Cl.
*C21C 5/40* (2006.01)
*C21C 7/072* (2006.01)

(52) U.S. Cl. ......................................... 75/581; 266/901

(58) Field of Classification Search .................... 75/581; 266/901, 155–157
See application file for complete search history.

(56) References Cited

U.S. PATENT DOCUMENTS

| 4,437,186 | A | | 3/1984 | Inai | |
|---|---|---|---|---|---|
| 4,559,629 | A | * | 12/1985 | Fedele Dell'Oste | 373/80 |
| 5,000,425 | A | * | 3/1991 | Brandstrom | 266/44 |
| 5,500,032 | A | * | 3/1996 | Nieder et al. | 75/414 |
| 5,520,372 | A | * | 5/1996 | Pohl | 266/155 |
| 2005/0028672 | A1 | * | 2/2005 | Hickerson et al. | 95/90 |
| 2005/0155457 | A1 | | 7/2005 | Monheim et al. | |

FOREIGN PATENT DOCUMENTS

JP             11156328 A  *  6/1999

* cited by examiner

*Primary Examiner*—George Wyszomierski
*Assistant Examiner*—Tima M McGuthry-Banks
(74) *Attorney, Agent, or Firm*—Abelman, Frayne & Schwab

(57) ABSTRACT

At the production of the secondary steel based on scrap, wherein the scrap (10) is fed in a scrap preheater (2) through a charging device (1), is preheated there and, finally, is brought into a smelting unit (3) and is melted there with primary energy only, the process gases (19), which leave the smelting unit (3), are not used any more for directly preheating the scrap (10) but are rather used indirectly by heating a gaseous preheatable medium, e.g., air (18) or inert gas, whereby energetic, fluidic, and spatial decoupling of preheating and melting and of post-combustion and preheating is achieved.

5 Claims, 4 Drawing Sheets

METHOD AND INSTALLATION FOR PRODUCTION OF SECONDARY STEEL BASED ON SCRAP

Figure 1:
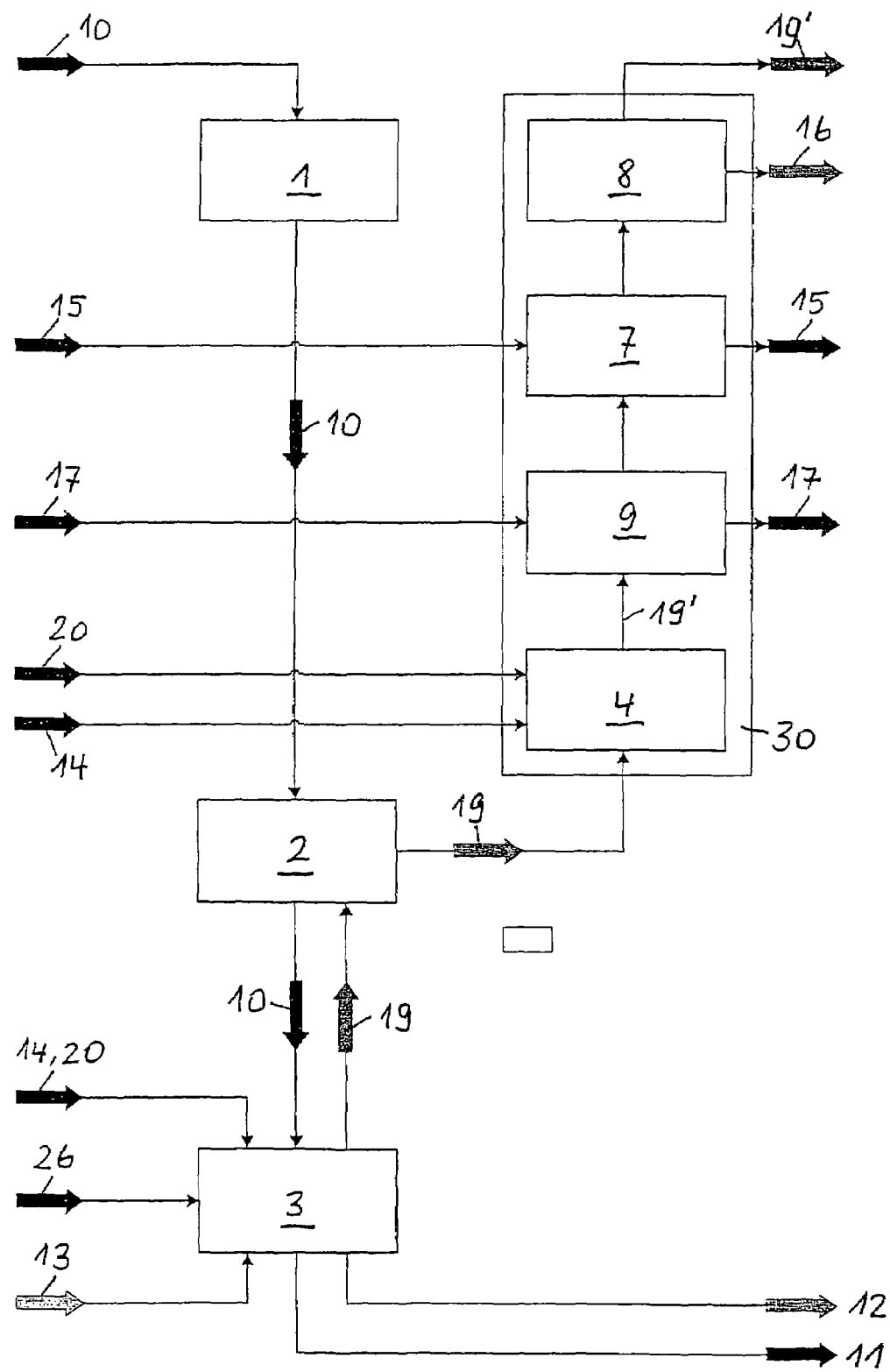

The invention relates to a method of and an installation for production of secondary steel based on scrap, wherein the scrap is fed in a scrap preheater through a charging device, is heated there and, finally, is brought in a smelting unit and is melted, wherein process gas which leaves the smelting unit, is used for preheating of the scrap, is freed of harmful materials and dust in a reheating device and in an adjoining dedusting installation, respectively, and is discharged from the installation as a cooled cleaned flue gas.

With such a method, the scrap is fed through a charging device in a preheater which, as a rule, is heated directly with a hot flue gas from a smelting unit, e.g., electrical arc furnace. It is mostly aspirated through the preheater, heating the scrap. The flue gas is cooled off. The preheated scrap (dependent on the process, to about 600-800° C.) is then transferred in a smelting unit and is melted with electrical energy. In addition, a fossil energy carrier (natural gas, coal, oil) is also used. As oxidation means, as a rule, technical oxygen (>95% by volume of $O_2$) is used. As additives for forming the flux, mostly mineral products (lime, dolomite) are used.

Dependent on the process conditions, the parameters (temperature, composition, oxygen content, dust content, amount) of the flue gas (process gas), which is produced during the melting process, are subjected to strong variations. In addition, the melting process is not continuous but rather discrete (batch operation).

The scrap contains, dependent on quality, type, and provenance, other accompanying products. The composition and amount of these mostly hydrocarbon-containing accompanying products (oils, fatty products, cooling and lubrication materials, coatings, etc.) differs to a very large degree.

The changeable flue gas values result, therefore, in strong variations of the operational parameters of the preheaters. This leads to undefined and non-stationary oxidation conditions of accompanying products which cling to the scrap. This is favorable to the formation of undesired flue gas components (CO, non-combusted hydrocarbons, aromates, chloride, . . . ). Those are produced mostly during evaporation and/or (partial) oxidation of the components clinging to the scrap.

In order to meet the legal requirements, an expensive flue gas treatment is necessary to eliminate and separate the non-combusted hydrocarbons and dioxins/furans. To this end, the flue gas is heated, after being discharged from the preheater, in a reheating chamber to a T>850° C. and after a certain dwell time of t>2 c is rapidly cooled to about 200° C. (is quenched). Thereby the new formation (denovo-syntheses) of dioxins/furans (PCDD/F) should be suppressed. In a following process stage, separation of the residual PCDD/F takes-place by injection of, e.g., lignite-coke dust (entrained-phase adsorption). The injected coke dust then is separated, together with the conventional fine dust, in a dedusting installation.

This type of a process insures maintaining of emission threshold for PCDD/F of 0.01 ng TE/$Nm^3$ but, however, is associated with increased additional expenses (for the primary energy for the burner, cooling water for quenching, waste water treatment system for quenching, silo, metering and delivery technique for the coke dust, etc.). In addition, the coal content in the filtered dust is increased above the permitted limit so that a thermal secondary treatment of the filtered dust before depositing is necessary.

The sum of these expenses exceeds the advantages (saving of electrical energy, increase of the productivity) that could have been expected from the use of the scrap preheating system. In addition, additional devices become responsible for additional disturbances in the installation.

In order to minimize these drawbacks, WO 03/068995 A1 suggests a smelting installation for a continuous production of steel with the use of metallic materials. The used materials such as, e.g., scrap, steel sponge or the like, are preheated in an upper part of a smelting vessel, which is formed as a shaft, and then are melted in its lower portion of the vessel with fossil fuels. The produced melted product is continuously fed in an adjacently arranged treatment vessel which is formed as an electrical arc furnace, and is brought there to the desired steel quality with electrical energy. For post-combustion, the post-combustion gases are delivered in different planes in the material column from outside and from inside through an inner shaft extending in the middle of the material column and with which a staged post-combustion of the ascending process gases is achieved, together with the reduction of oxidation of the iron-containing initial material.

With this known process, only the primary energy is used for melting the scrap. In order to prevent oxidation of iron, heating in the melting stage should be carried out non-stoichiometrically with an air ratio in a range 0.5-0.9. Therefore, the flue gas contains, after leaving a separate melting stage, still a large amount of combustible components (in particular CO, $H_2$ and $CH_4$). This results in a poor use of the used energy carrier. Therefore, further measures are necessary in order to improve the energy use which results in increased costs. To this end, there is provided means for feeding the reheating air in the shaft above the melting zone (integrated after burning). This measure improves the energy use, however, for different reasons, probably, no complete conversion of non-combusted materials in the shaft is possible. Moreover, the flue gas should be withdrawn at the shaft outlet with a temperature about 800° C. in order to prevent an additional post-combustion stage.

It is an object of the invention to provide a method and an installation with which the described drawbacks of the preheating and melting with an exclusive use of primary energy, are reliably prevented or at least are minimized.

The set object is achieved with regard to method with characterized features of claim 1 and with regard to installation with characterized features of claim 14, namely, with reference to the gas flow control of the preheating system, by energetic, fluidic and spatial decoupling of preheating and melting and energetic, fluidic and spatial decoupling of post-combustion and preheating.

In comparison with a conventional flue gas treatment, with the sequence of installation components:

Post-combustion-cooling-separation of harmful materials-dedusting the inventive system consists, in principle, of the same components, however, with a new sequence:

Harmful material separation-Post-combustion-Cooling-Dedusting.

The flue gas, which is referred to as a process gas, according to the invention, is not used directly from the melting stage for preheating the scrap, i.e., the preheating is carried out not immediately with the process gas from the melting stage but rather with a further gaseous preheating medium, e.g., air, oxygen-enriched air, or inert gas.

The process gas is fed directly to the post-combustion stage with admixing of combustion oxygen. Thereby, with the use of reliable metering and regulating devices, a controlled and complete conversion of all of combustible components is insured. It is also possible, alternatively, to feed back a portion of the process gas directly to the melting stage, without a further aftertreatment.

A hot flue gas after post-combustion is used in a heat exchanger for preheating of the preheating medium and is, thereby, cooled.

With the use of a heat exchanger instead of a quencher, the inventive thermal, energetic and spatial decoupling of process stages: melting-preheating and post-combustion-preheating.

An additional degree of freedom with regard to conducting the process is obtained, while only regulation of the hot air temperature at the entrance of the preheating stage is possible. This can be effected by changing the air ratio in the post-combustion stage, by changing the amount of air, or by a combination of both measures. In addition, the heating of the melting stage can be controlled independently of the post-combustion or of the scrap preheating.

The preheating medium, which was produced with the flue gas in the heat exchanger can flow in the same direction or in the opposite direction in the preheater. Because both the amount and temperature of the oxygen content can be maintained constant, constant stationary operational condition can be retained in the preheating stage. Thereby, the scrap preheating temperature before charging can also be maintained constant.

With constant operational conditions in the preheating stage (sufficiently high hot air temperature, constant $O_2$—content or clear surplus of oxygen), all of the undesirable accompanying materials are converted into a gas in a completely oxidized condition. With a high oxygen surplus, no carbonization/coking reaction take place, whereby formation of precursor substances for PCDD/F is effectively prevented. The volatile substances are carried away from the preheater together with the preheating medium.

The waste air loaded with harmful materials is treated in an adsorber. There, the harmful materials are converted from a gas phase into a porous solid phase and are, thus, concentrated adsorbent. In particular, active coke on the basis of brown coke (hearth furnace coke (HOK)) or special adsorbent mixtures are suitable as adsorbent. Very good precipitation behavior of HOK for organic substance and alkalis is known from its use in different fields (in particular in refuse combustion installations—smoky gas cleaning). The loaded adsorbent either is completely removed from the process or is partially recirculated into the melting stage.

The cleaned preheating medium as soon as it is enriched with oxygen, is used for post-combustion of the process gas. Dependent on the process gas parameters, a supporting heating can be necessary.

The scrap after leaving the preheater is "clean", i.e., all of clinging hydrocarbons were converted into a gas phase. Thereby, the loading of the process gas with dust at the outlet of the melting stage, in comparison with a conventional process, is substantially prevented.

In comparison with a conventional process, secondary or spatial dedusting can be dispensed with as all of the components can be made gastight. This permits a noticeable reduction in the to-be-treated flue gas amount and, thereby, of the size of separate installation components. Due to the inventive energy decoupling of process stages melting-preheating-post-combustion, the process can be conducted with high flexibility and, simultaneously, with high energy efficiency.

According to the invention, additional bypass conduits can be provided in the hot air loop in order to improve the temperature control of the entire process:

Admixing of cold air to the warm air, which is loaded with harmful materials, at the outlet of the scrap preheater for controlling the entry temperature in the adsorbtion device.

Returned of the clean warm air directly in the fresh air stream in front of the heat exchanger for controlling the temperature in the reheating device.

Use of a portion of the hot air as oxidation means for the smelting unit. The feeding can be effected directly in the melting zone.

Use of a portion of the hot air as oxidation means for post-combustion. Thereby, the flue gas temperature can be increased or retained constant at a low residual calorific value or at a small amount of the process gas (small melting capacity). This expansion is advantageous for carrying out the process, starting from a cold condition for rapidly reaching the production temperature.

According to an alternative embodiment of the invention, a further or other medium (e.g., inert gas) can be used as a preheating medium for scrap, wherein the post-combustion air, which is necessary for post-combustion of the process gas, is heated in a second heat-exchanger. The further or other preheating medium then is circulated in closed loop between the installation components Heat Exchanger-Scrap Preheater-Adsorbtion Device.

Thereby, a most possible decoupling of the combustion stage from the preheating stage is effected, whereby high scrap temperatures at the outlet of the preheater can be realized. This results in that technical and economical limits of the process can be set as a result of ever diminishing oxidation with increase of the gas temperature.

Further particularities of the basic principle of the invention will be explained below in detail with reference to flow charts shown in the drawings. The flow charts include only the process steps and material flows which are necessary for understanding of the invention. Thus, cooling water flows, coarse dust and spark separator as well as devices for space dedusting are, e.g., mostly missing.

Figure 2:
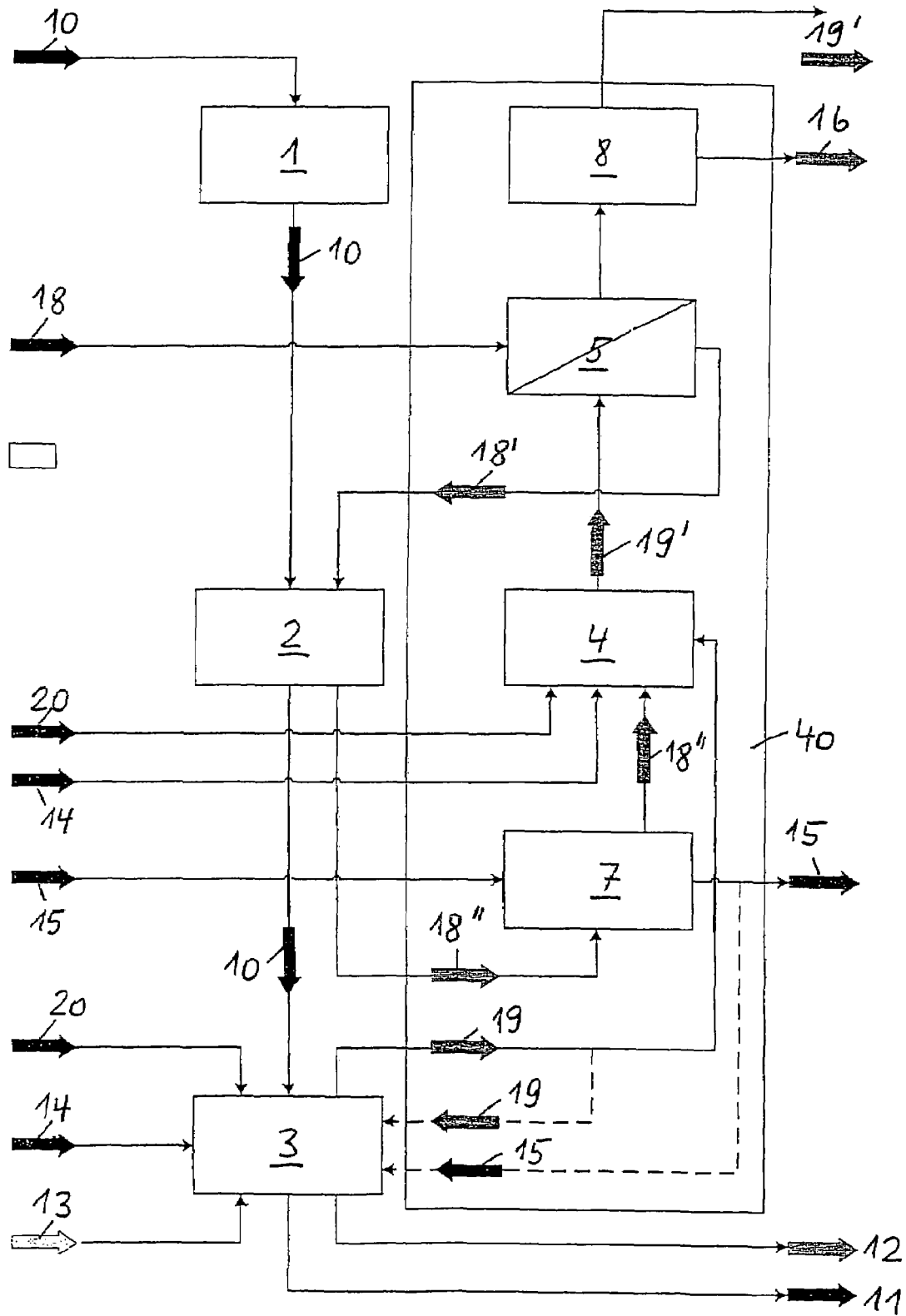
Figure 3:
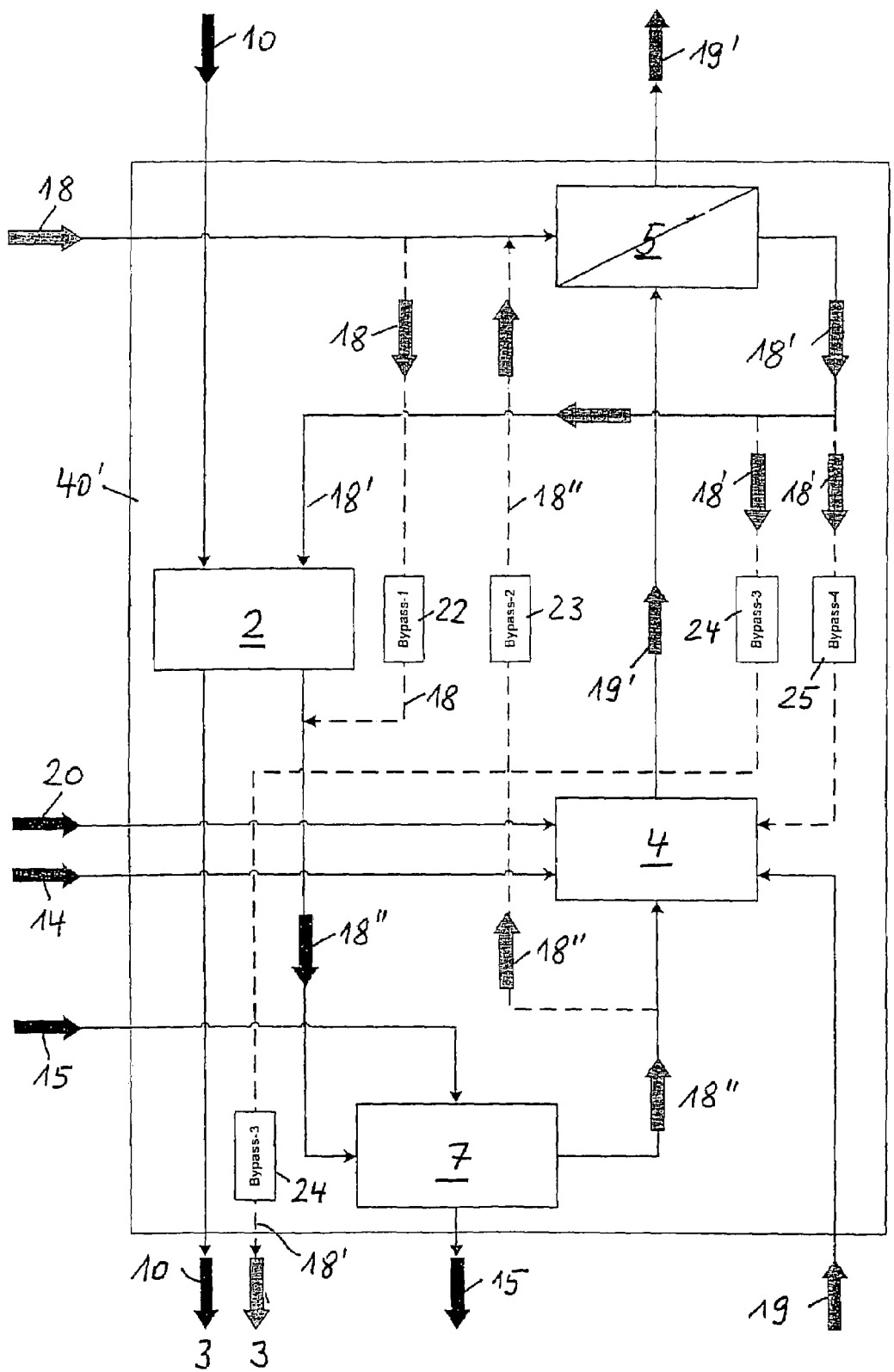
Figure 4:
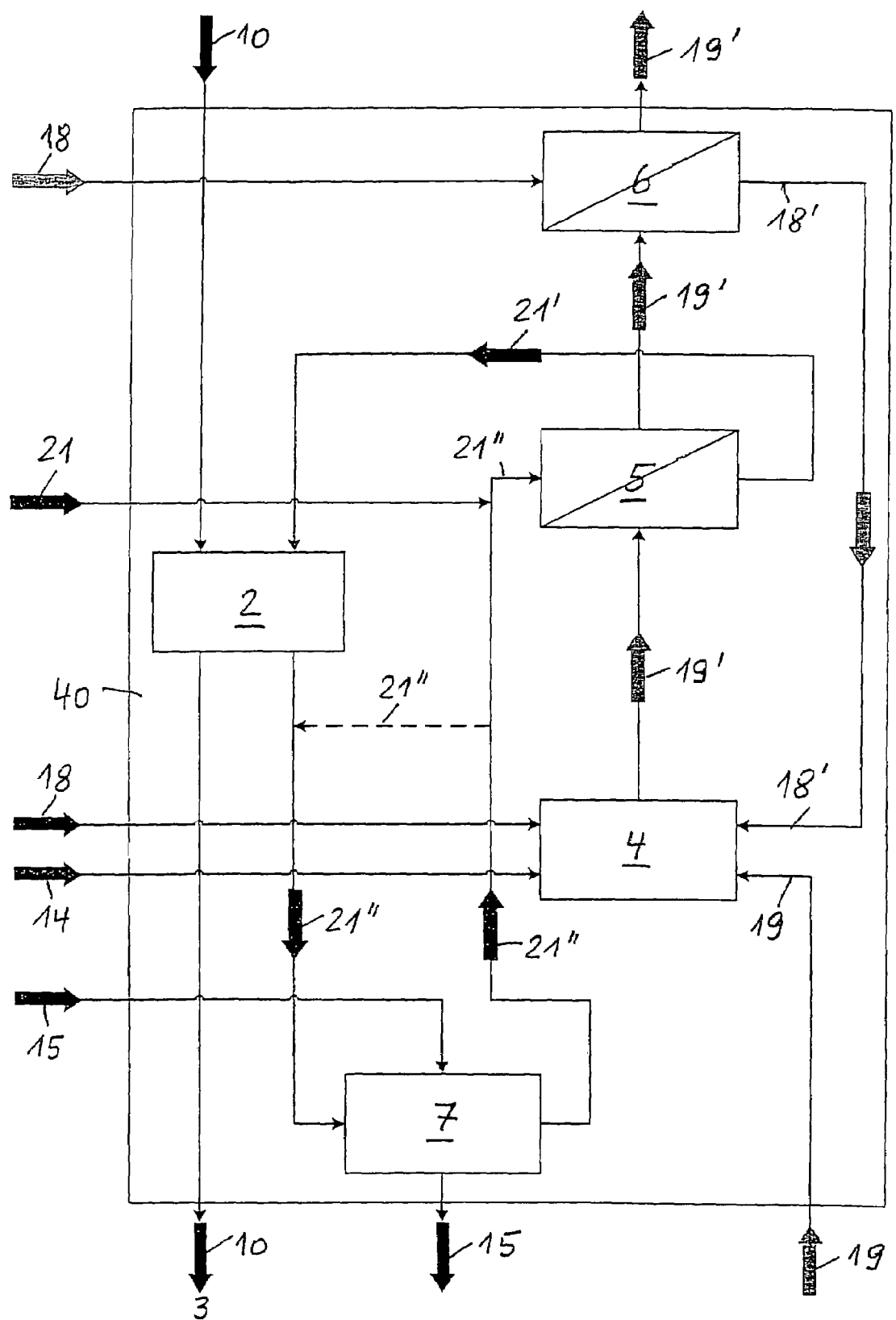

The drawings show:

FIG. 1 a simplified scheme of a typical preheating and flue gas treatment step of a melting process with scrap preheating according to the state of the art;

FIG. 2 a simplified scheme of the open preheating and flue gas treatment step of the melting process with scrap preheating according to the invention;

FIG. 3 portion of a basic flow chart of FIG. 2 showing preheating and flue gas treatment expanded by the use of bypass conduits; and FIG. 4 An alternative scheme of preheating and flue gas treatment with a closed circulation of the preheating medium and a separate preheating of the post-combustion air.

FIG. 1 shows a simplified basic flow chart of a typical flue gas cleaning of a melting process with scrap preheating. Scrap 10 is fed to a scrap preheater 2 through a charging device 1 and is heated there with process gas 19 of a smelting unit 3. The heated scrap 10 is then fed in the smelting unit 3 where it is melted with addition of oxygen 20 and additives 13, by a fossil and/or electrical energy, and leaves the smelting unit 3 as melt 11 and flux 12.

After leaving the scrap preheater 2, the process gas 19 is fed to a flue gas treatment system 30 where it is reheated, with addition of oxygen 20, by fossil energy 14. The flue gas 19', which was produced in the reheating unit 4, is then cooled in a cooling device 9 with water 17, is freed from harmful materials in an adsorbtion device 7 by addition of an adsorbent 15 and, finally, is separated from dust 16 in a dedusting apparatus 8.

FIG. 2 shows a simplified scheme of an inventive flue gas treatment system 40 with an open preheating and flue gas treatment of the melting process with scrap preheating. Here likewise, the scrap 10 is fed in the preheater 2 through a charging device 1 but is not directly heated there any more by the process gas 19 of the smelting unit 3, but is heated indirectly by hot air 18' that is produced in a heat exchanger 5 as a result of heating of air 18 with the process gas 19. As in FIG. 1, the hot scrap 10 is fed in the smelting unit 3 where it is melted, with addition of additives and, if necessary, of adsorbent loaded with harmful materials, of oxygen and, if necessary, of returned process gas 19, exclusively by fossil energy into melt 11 and flux 12.

After leaving the scrap preheater 2, the process gas 19 is fed to a flue gas treatment system 40 according to the present invention where it is likewise post-combusted in the reheating unit 4 by fossil energy 14 with addition of oxygen 20 and of cleaned warm air 18" from the adsorbing device 7. The produced heated flue gas 19' is fed in the heat exchanger 5 where it heats fresh air 19, and is finally freed from dust 16, in the dedusting device 8.

The open circulation of the preheated air 18 is carried out as follows: air 18, which is heated in the heat exchanger 5 to hot air 18', is fed into the scrap preheater 2 and leaves it as a warm air 18" loaded with harmful materials, is freed from harmful materials in the adsorbing device 7 by the introduced adsorbent 15, and then is used in the reheating device 4 as oxidation means for the process gas 19. Further, treatment of the warm air 18" is carried out, together with the process gas 19, as flue gas 19' in a manner that has already been described above.

FIG. 3 shows a portion of the flue gas treatment system 40 of FIG. 2 which is expanded with a scrap preheater 2 and separate bypasses 22, 23, 24, 25 for a better regulation of the temperature in the air circulation path. In the so expanded flue gas treatment system 40' with a bypass 22, fresh air 18 is admixed to the warm air 18" loaded with harmful materials before feeding it in the reheating device 4, a bypass 23, the warm air 18" which is freed from harmful materials, is admixed to the fresh air 18, a bypass 24, the hot air 18', which was produced in the heat exchanger 5, is fed directly to the smelting unit 3, a bypass 25, the hot air 18', which was produced in the heat exchanger 5, is fed directly in the device 4.

Thus, bypasses 22, 23, 24, 25 permit to additionally influence the temperature control of the separation of harmful materials, of air heating, of melting, and post-combustion in a simple way.

FIG. 4 shows an alternative scheme of preheating and flue gas treatment in an inventive flue gas treatment system 40' with a closed loop for the preheating medium and separate preheating of the post-combustion air. In the shown embodiment, as a preheating medium, an inert gas 21, which is heated to a hot gas 21' in the heat exchanger 5, is used and which is fed in a closed loop to the heat exchanger 5 after heating the scrap and a subsequent separation of harmful materials. If necessary, with this process, it is also possible to return (see the dash line in FIG. 4) a partial amount of the warm gas 21" which is freed from harmful materials, before its renewed heating, to the warm gas 21" loaded with harmful materials. Thus, air 18, which is necessary for reheating, is completely separated from the preheating medium, the hot gas 21' and, therefore, is heated to the hot air 18' in a separate heat exchanger 6.

The method of the invention and the installation for its implementation are not limited to the shown embodiments; rather, separate installation components and the connection conduit systems can be arranged differently or expanded by a specialist in accordance with the existing conditions. The inventive energetic, fluidic, and spatial separation of preheating and melting and of post-combustion and preheating should be retained in each case.

LIST OF REFERENCE NUMERALS

Method Steps
    1 Charging device
    2 Scrap preheater
    3 Smelting unit
    4 Reheating device
    5 Heat exchanger for preheating
    6 Heat exchanger for reheating
    7 Adsorbtion device for separating harmful materials
    8 Dedusting installation
    9 Cooling device Solid or Fluid Materials
    10 Scrap
    11 Melt
    12 Flux
    13 Additives
    14 Fossil energy carrier
    15 Adsorbent
    16 Dust
    17 Water Gases
    18 Air
    18' Hot air
    18" Warm air
    19 Flue gas (process gas)
    19' Flue gas (after reheating)
    20 Oxygen
    21 Inert gas
    21' Hot inert gas
    22" Warm inert gas Other
    22 Bypass 1 (admixing air to warm air)
    23 Bypass 2 (admixing warm air to air)
    24 Bypass 3 (hot air directly to melt)
    25 Bypass 4 (hot air directly to reheating)
    26 Electrical energy
    30 Flue gas treatment system according to the state of the art
    40 Flue gas treatment system with an open preheating loop
    41 Flue gas treatment system with a closed preheating loop.

The invention claimed is:

1. A method of producing secondary steel based on scrap (10), comprising the steps of feeding the scrap (10) into a scrap preheater (2) and heating the scrap (10) in the scrap preheater (2); feeding the heated scrap from the scrap preheater (2) into a smelting unit (3); melting the scrap in the smelting unit (3); feeding process gas (19), which is produced in the smelting unit (3), from the smelting unit (3) into reheating device (4); in the reheating device (4), freeing the process gas (19) of harmful materials; cooling a clean process gas that leaves the reheating device; feeding the cooled process gas in a dedusting installation (8) located downstream of the reheating device (4) and freeing the cooled process gas there of dust; discharging the cooled cleaned process gas as a cooled cleaned flue gas (19'), wherein the step of feeding the process gas from the smelting unit into the reheating device includes feeding the process gas (19) directly into the reheating device (4), and the cooling step includes cooling the reheated process gas in a heat exchanger (5, 6) by heating another gas (18, 21) that flows through the heat exchanger, wherein the step of preheating the scrap in the scrap preheater (2) is carried out by hot another gas that was heated in the heat exchanger (5), the another gas being inert gas (21), the method further comprising the step of separating a preheated inert gas (21') after it has been used for preheating the scrap (10), as a cooled warm inert gas (21"), from harmful materials in an adsorption device (7) with an adsorbent (15), the method further comprising the step of feeding the inert gas (21), after it has been separated from harmful materials, to the heat exchanger (5) in a loop.

2. A method according to claim 1, comprising the step of feeding a portion of the inert gas (21) in a closed loop back into the adsorption device (7), without it passing through the heat exchanger.

3. A method of producing secondary steel based on scrap (10), comprising the steps of feeding the scrap (10) into a scrap preheater (2) and heating the scrap (10) in the scrap preheater (2); feeding the heated scrap from the scrap preheater (2) into a smelting unit (3); melting the scrap in the smelting unit (3); feeding process gas (19), which is produced in the smelting unit (3), from the smelting unit (3) into reheating device (4); in the reheating device (4), freeing the process gas (19) of harmful materials; cooling a clean process gas that leaves the reheating device; feeding the cooled process gas in a dedusting installation (8) located downstream of the reheating device (4) and freeing the cooled process gas there of dust; discharging the cooled cleaned process gas as a cooled cleaned flue gas (19'), wherein the step of feeding the process gas from the smelting unit into the reheating device includes feeding the process gas (19) directly into the reheating device (4), and the cooling step includes cooling the reheated process gas in a heat exchanger (5, 6) by heating another gas (18, 21) that flows through the heat exchanger, wherein the step of preheating the scrap in the scrap preheater (2) is carried out by hot another gas that was heated in the heat exchanger (5), the another gas being inert gas (21), the method comprising the step of heating air (18) necessary for post-combustion in a heat exchanger (16) located downstream of the heat exchanger (5) in which the inert gas (21) is heated.

4. A method of producing secondary steel based on scrap (10), comprising the steps of feeding the scrap (10) into a scrap preheater (2) and heating the scrap (10) in the scrap preheater (2); feeding the heated scrap from the scrap preheater (2) into a smelting unit (3); melting the scrap in the smelting unit (3); feeding process gas (19), which is produced in the smelting unit (3), from the smelting unit (3) into reheating device (4); in the reheating device (4), freeing the process gas (19) of harmful materials; cooling a clean process gas that leaves the reheating device; feeding the cooled process gas in a dedusting installation (8) located downstream of the reheating device (4) and freeing the cooled process gas there of dust; discharging the cooled cleaned process gas as a cooled cleaned flue gas (19'), wherein the step of feeding the process gas from the smelting unit into the reheating device includes feeding the process gas directly into the reheating device (4), and the cooling step includes cooling the reheated process gas in a heat exchanger (5, 6) by heating another gas (18, 21) that flows through the heat exchanger, wherein the step of preheating the scrap in the scrap preheater (2) is carried out by hot another gas that was heated in the heat exchanger (5), the another gas being air (18), wherein the method comprises the steps of: separating the hot gas (18') after it has been used for preheating the scrap (10), as a cooled warm gas (18"), from harmful materials in an adsorption device (7) with an adsorbent (15), further feeding the air, after separation from harmful materials, in the reheating device (4) for using it there as oxidation means for post-combustion of the process gas (19), admixing air (18) to a clean warm air (18"') in a bypass (23) in front of the heat exchanger (5) for regulating temperature of a hot air (18') fed to the scrap preheater (2), and feeding a portion of the hot air (18') as an additional oxidation means directly in the smelting unit (3) through a bypass (24).

5. A method according to claim 4, comprising the step of feeding a portion of hot air (18') in the reheating device (4) as additional oxidation means through a bypass (25).

\* \* \* \* \*